(12) United States Patent
Larnicol et al.

(10) Patent No.: US 10,590,501 B2
(45) Date of Patent: *Mar. 17, 2020

(54) METHOD OF TREATMENT OF A RUNNING FERROUS ALLOY SHEET AND TREATMENT LINE FOR ITS IMPLEMENTATION

(71) Applicant: ARCELORMITTAL, Luxembourg (LU)

(72) Inventors: Maiwenn Tifenn Soazig Larnicol, Saint-Marc (BE); Michel Roger Louis Bordignon, Sprimont (BE); Xavier Marc Jacques Edmond Robert Vanden Eynde, Braives (BE); Ana Isabel Farinha, Namur (BE); Pascal Gerkens, Baelen (BE); Jean-Francois Noville, Milmort (BE); Julien Christopher Michel Smal, Temploux (BE)

(73) Assignee: ARCELORMITTAL, Luxembourg (LU)

( * ) Notice: Subject to any disclaimer, the term of this patent is extended or adjusted under 35 U.S.C. 154(b) by 1174 days.

This patent is subject to a terminal disclaimer.

(21) Appl. No.: 14/766,326

(22) PCT Filed: Feb. 6, 2013

(86) PCT No.: PCT/IB2013/050987
§ 371 (c)(1),
(2) Date: Aug. 6, 2015

(87) PCT Pub. No.: WO2014/122500
PCT Pub. Date: Aug. 14, 2014

(65) Prior Publication Data
US 2015/0368730 A1    Dec. 24, 2015

(51) Int. Cl.
*C07D 471/04* (2006.01)
*A61K 31/4375* (2006.01)
(Continued)

(52) U.S. Cl.
CPC .......... *C21D 1/46* (2013.01); *C21D 6/00* (2013.01); *C21D 9/46* (2013.01); *C21D 9/52* (2013.01);
(Continued)

(58) Field of Classification Search
CPC . C21D 1/46; C21D 1/607; C21D 1/43; C21D 9/46
See application file for complete search history.

(56) References Cited

U.S. PATENT DOCUMENTS 1,724,552 A    8/1929 Bellis
4,473,412 A    9/1984 Maruhasi et al.
(Continued)

FOREIGN PATENT DOCUMENTS

CN    102712988 A    10/2012
FR    511106    12/1920
(Continued)

*Primary Examiner* — Lois L Zheng
(74) *Attorney, Agent, or Firm* — Davidson, Davidson & Kappel, LLC

(57) ABSTRACT

A method of treatment of a running ferrous alloy sheet containing at least one easily oxidized element is provided. The method includes a step of immersion of the sheet in a molten oxides bath.
The molten oxides bath has a viscosity between $0.3 \cdot 10^{-3}$ Pa·s and $3.10^{-1}$ Pa·s, the surface of the bath is contact with a non-oxidizing atmosphere, and the molten oxides are inert towards iron. The residence time of the running sheet in the bath is at least 1 s and the residues of oxides remaining on the surfaces of the sheet at the exit of the bath are eliminated.
A treatment line of a ferrous alloy sheet for implementing the method, is provided. The treatment line includes a molten oxides bath having a viscosity between $0.3 \cdot 10^{-3}$ and $3.10^{-1}$ Pa·s. The surface of the bath is contact with a non-oxidizing atmosphere, and the molten oxides are inert towards iron.

(Continued)

Mechanical devices for eliminating the residues of molten oxides remaining on the surfaces of the ferrous alloy sheet are at the exit of the molten oxides bath.

17 Claims, 2 Drawing Sheets

(51) Int. Cl.
*C21D 1/46* (2006.01)
*C23C 2/06* (2006.01)
*C23C 2/02* (2006.01)
*C21D 9/46* (2006.01)
*C23C 28/00* (2006.01)
*C23C 2/40* (2006.01)
*C23C 2/20* (2006.01)
*C21D 6/00* (2006.01)
*C21D 9/52* (2006.01)
*C23F 17/00* (2006.01)

(52) U.S. Cl.
CPC ............... *C23C 2/02* (2013.01); *C23C 2/06* (2013.01); *C23C 2/20* (2013.01); *C23C 2/40* (2013.01); *C23C 28/3225* (2013.01); *C23C 28/345* (2013.01); *C23F 17/00* (2013.01); *Y02P 10/212* (2015.11)

(56) References Cited

U.S. PATENT DOCUMENTS

2008/0083477 A1 4/2008 Drillet et al.
2013/0011693 A1 1/2013 Smith et al.

FOREIGN PATENT DOCUMENTS

| | | |
|---|---|---|
| GB | 2117374 | 10/1983 |
| JP | S58164733 A | 9/1983 |
| JP | S6228059 A | 2/1987 |
| JP | H10251744 A | 9/1998 |
| JP | 2010133022 A | 6/2010 |
| RU | 2363756 C2 | 8/2009 |
| RU | 2463379 C2 | 10/2012 |
| SU | 1482961 A1 | 5/1989 | ns to the wetting properties.

METHOD OF TREATMENT OF A RUNNING FERROUS ALLOY SHEET AND TREATMENT LINE FOR ITS IMPLEMENTATION

The present invention relates to a method of treatment of the surface of ferrous alloy strips, like steel strips, for example in view of its coating by galvanization, the ferrous alloy having a significant content in easily oxidized elements.

BACKGROUND

Metallic coating of steel strips by hot dipping is usually performed by a process comprising essentially the following steps:

annealing of a running steel strip in a furnace under an inert or reducing atmosphere, in order to avoid an oxidation of the strip surface;

dipping of the running strip into a vessel containing a bath of metal or of a metal alloy in the liquid state; so the strip gets coated with metal/metal alloy as it exits the bath.

after the exit of the strip from the liquid bath, wiping of the metal/metal alloy layer by projecting a gas onto its surface, in order to ensure that the layer has an even and regular thickness.

The heating of the strip during its annealing step, before it enters the metal bath (in the following parts of the specification, it must be understood that when speaking of the "metal bath" or "metal layer", any metal alloy baths and corresponding metal alloy layers such as Al/Al alloy or Zn/Zn alloy will also be encompassed by this expression) usually takes place in a direct-fired annealing furnace or a radiant tube annealing furnace. However, the use of these furnaces to heat the sheet can lead to the formation of oxides on the surfaces of the sheet, which must then be eliminated by additional pickling and/or shot blasting steps before coating. If not, the wettability of the liquid metal on the steel sheet surface is insufficient, inducing notably bare spots on the steel surface.

This drawback is particularly met when the strip composition includes significant amounts of easily oxidized elements like Si, Mn, Al, Cr, B, P and so on.

One can consider that the contents over which this drawback can be met are about 0.5% in weight for Si, Mn, Al, P and Cr, and 5 ppm for B, if these elements are taken isolately. But these limits can be sensibly lower when several of these elements are present in the steel. For example, an interstitial-free bake-hardenable steel with 0.2% of Mn, 0.02% of Si and 5 ppm of B may already undergo such wetting problems, due to the presence of B which rapidly diffuses up to the strip surface and makes the Mn and Si oxide precipitate as continuous films, leading to a bad wetting, rather than as nodules which would not be too detrimental to the wetting properties.

Generally speaking, this risk of bad wetting by liquid metal is also met on all high strength steels, since they comprise at least one of said elements, like dual-phase steels, TRIP (TRansformation Induced Plasticity) steels, TWIP (TWining-Induced Plasticity) steels, electric steels and so on. For dual phase steels, the amount of Mn is generally lower than 3% by weight, with addition of Cr, Si or Al in an amount generally lower than 1% by weight. For TRIP steels, the Mn amount is generally lower than 2% by weight associated with maximum 2% by weight Si or Al. For TWIP steel, the Mn amount can be as high as 25% by weight, associated with Al or Si (max 3% by weight).

Steels with a low density containing notably Al and/or Si in big amounts (up to 10% by weight) are also sensitive to this phenomenon, as well as, for example, high Cr stainless steels for thermal treatments.

SUMMARY OF THE INVENTION

It is an object of the present invention to provide the steelmakers with a method which improves the adhesion of the metal or metal alloy coating on steel strips which contain significant amounts of easily oxidizable elements.

The present invention provides a method of treatment of a running ferrous alloy sheet containing at least one easily oxidized element, comprising a step of immersion of said sheet in a molten oxides bath, wherein:

said molten oxides bath has a viscosity between 0.3.10−3 Pa·s and 3.10−1 Pa·s, the surface of said bath being in contact with a non-oxidizing atmosphere, and said molten oxides are inert towards iron;

the residence time of said running sheet in said bath is at least 1 s;

the residues of oxides remaining on the surfaces of said sheet at the exit of the bath are eliminated.

The running sheet may, then, be immersed into a coating bath of molten metal or metal alloy.

The residence time of said running sheet in said molten oxides bath may be between 1 and 10 s.

Before the entry of the sheet into the molten oxides bath, the sheet may undergo a thermal treatment.

The composition of the molten oxides bath may be:

45% w≤B2O3≤90% w;

10% w≤Li2O≤45% w;

and, optionally, between 0.1% and 20% of one or several of Na2O, CaO, K2O.

Said easily oxidizable element may be at least one element chosen among Si, Mn, Al, Cr, B, P.

Said coating bath may be a bath of molten Zn or Zn alloy.

The invention is also a treatment line of a ferrous alloy sheet for implementing said method of treatment, comprising :

a molten oxides bath having a viscosity between 0.3.10−3 and 3.10−1 Pa·s, the surface of said bath being in contact with a non-oxidizing atmosphere, said molten oxides being inert towards iron and means for eliminating the residues of molten oxides remaining on the surfaces of said ferrous alloy sheet at the exit of said molten oxides bath.

It may comprise means for heating the ferrous alloy sheet, located upstream the molten oxides bath.

It may comprise means for coating the ferrous alloy sheet with a molten metal or metal alloy, located downstream the molten oxides bath.

Said molten metal or metal alloy may be Zn or Zn alloy.

The means for eliminating the residues of molten oxides remaining on the surfaces of said ferrous alloy sheet at the exit of said bath may include nozzles which project a gas onto the sheet surface.

The means for eliminating the residues of molten oxides remaining on the surfaces of said ferrous alloy sheet at the exit of said bath include cooling means for the sheet.

The means for eliminating the residues of molten oxides remaining on the surfaces of said ferrous alloy sheet at the exit of said bath may include mechanical devices.

As the reader has understood it, the invention relies on the immersion, at least during a very short time, of an order of magnitude of 1 to 5 seconds, of the running sheet, which contains oxidizable elements at significant levels, in a molten oxides bath having a viscosity in a predefined range. These molten oxides combine with the oxides present on the sheet surface and remove them from the surface.

When the sheet exits the bath, it is nearly free of any oxide other than some droplets of oxides from the bath, which can be easily removed by any suitable means such as a mechanical treatment or a gas blowing operation. This is due to the fact that the molten oxides viscosity is regulated to a very low level, through selection of appropriate composition and bath temperatures, and only a very small amount of molten oxides is taken away from the bath by the strip surface. The surfaces of the sheet are very clean so that they are perfectly prepared to undergo a coating process like a galvanization, preferably on the same treatment line.

Between its exit from the molten oxides bath and its penetration into the coating bath, it is advisable to protect the running sheet from the ambient atmosphere, in order to avoid a reoxidation of its surface. To this end, the sheet can, for example, run in a protective sleeve filled with a non-oxidizing or reducing atmosphere for iron between the two baths.

The method of the invention may also have other functions, at least in some configurations. In particular, it may replace the conventional annealing operation in a furnace by allowing the sheet to stay for a longer time in the molten oxides bath To this end, the duration of the stay of the running sheet through the molten oxides must be set at a high value, for example at an order of magnitude of 10 to 60 s. Another advantage of this treatment in liquid oxides is that it allows obtaining very good temperature homogeneity along the strip width and length, which is of paramount importance for high strength steels.

It has to be noted that the passage of the sheet in the molten oxides bath during 1 to 5 s is usually not sufficient for sensibly modifying the steel structure in a way which would allow obtaining a high mechanical resistance. In that case, the method is performed to ensure the oxide layer removal only, after a conventional annealing, by letting the running sheet cross the molten oxides bath during a few seconds only.

When the elimination of oxides according to the invention is performed after a conventional annealing step, it has been seen that the dew point of the annealing atmosphere has no particular influence on the efficiency of the oxide removal by the molten oxides bath. So, the invention, when used after a conventional annealing step, allows using less stringent annealing conditions than usual, in case where the strip surface can get strongly oxidized during the annealing.

BRIEF DESCRIPTION OF THE DRAWINGS

The invention will be better understood thanks to the following description, which refers to the appended figures.

DETAILED DESCRIPTION

Figure 1:
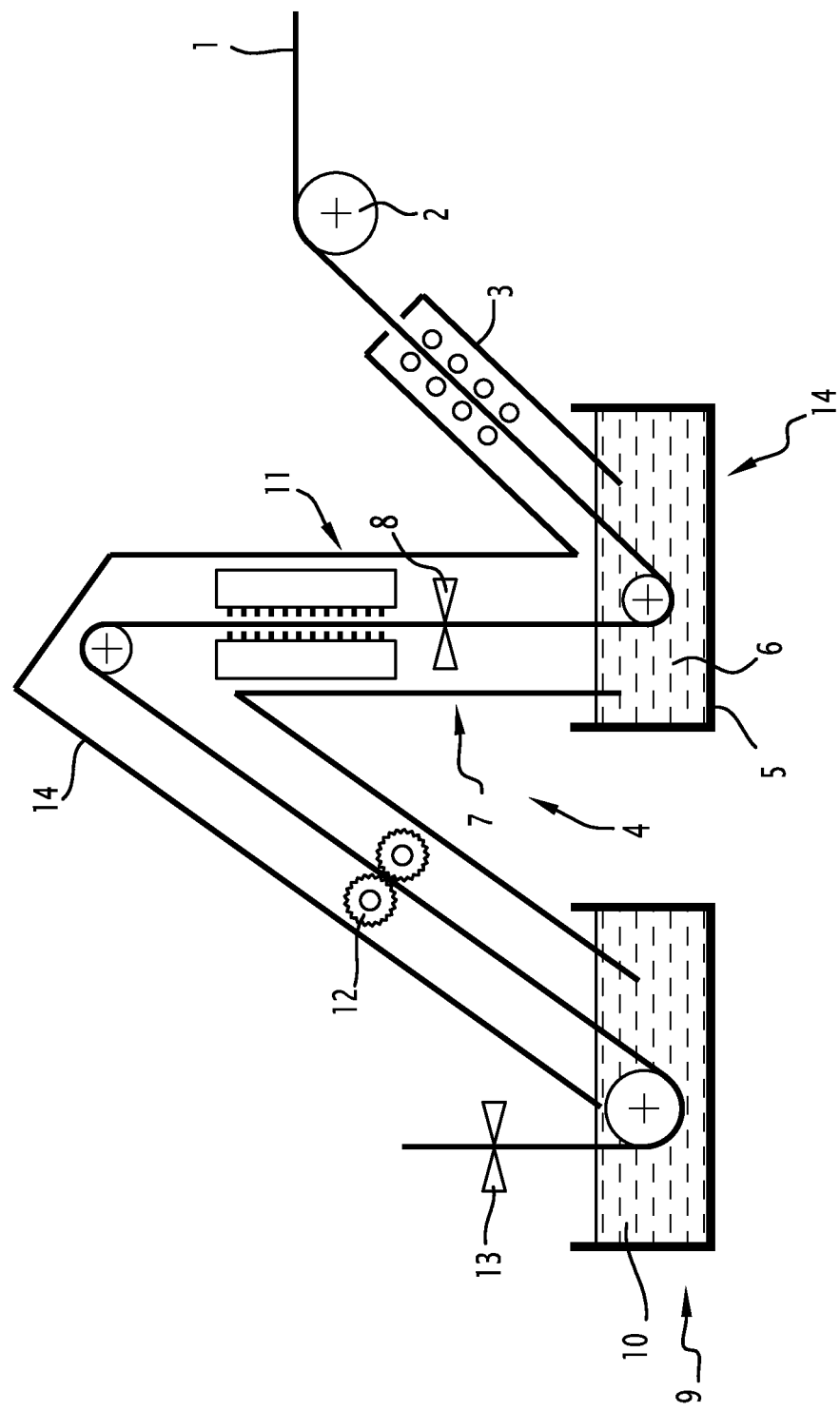
FIG. 1, which shows an example of a treatment line including coating operations, which can be used to implement the invention.

As illustrated in FIG. 1, a cold rolled steel sheet 1, which contains significant amounts of easily oxidizable elements as said before, continuously runs through the different modules of the line, and is moved by a group of transport rolls 2. This cold rolled sheet then crosses an oven 3 placed under a non-oxidizing or reducing atmosphere, like pure argon, pure nitrogen, or a mixture of one of these gases with hydrogen. This oven 3 may have two functions.

The first function, which is the most classical since it is met on all continuous annealing ovens in galvanizing lines, is to perform an annealing of the running sheet 1, by bringing it to a temperature allowing this thermal treatment, and which can be as high as 900° C. for a carbon steel, or 1100° C. for a stainless steel, during a time period sufficient for this thermal treatment to be performed on the whole sheet thickness. Most generally, the duration of this time period is 60 s for a carbon steel and some seconds for a stainless steel. It depends mainly on the sheet temperature to be reached and on the speed of the sheet 1. If necessary, the oven 3 may by followed by a cooling device which sets the temperature of the sheet 1 at a value convenient for its entrance into the molten oxides bath 6.

The second possible function of this oven 3 is merely to heat the sheet 1 at a temperature which is compatible with the following step of the treatment, as it shall be seen later on, without having in view the performing of a particular metallurgical treatment on the sheet 1.

The steel sheet 1, then, crosses a surface cleaning module 4. This cleaning module 4 comprises a vessel 5 containing a bath 6 of molten oxides which are inert towards iron. In other words, these oxides do not chemically react with the metallic surfaces of the sheet 1. The molten oxides bath only dissolves the oxides present on the surface before dipping into it.

In this embodiment, the bath 6 has a temperature TB equal to or higher than the temperature TS of the steel sheet 1 when it enters the bath 6, and has a viscosity at this temperature TB between $0.3.10-3$ Pa·s and $3.10-1$ Pa·s. The temperature TB of the bath 6 is set between 600 and 900° C., and preferably between 700° C. and 800° C. The bath 6 is kept at said temperature TB by heating means (not shown) such as induction heating means or heat exchangers associated with a circulating pump.

Generally speaking, the temperature of the bath usually lies between 600 and 1100° C., with an upper limitation at the temperature where the molten oxides bath begins to evaporate.

The composition of the bath 6 is, for example, between 45% and 90% in weight of $B_2O_3$ (boundaries included, as for all the other contents), between 10% and 45% in weight of $Li_2O$, and, optionally, a total content between 0.1% and 20% of one or several oxides among $Na_2O$, $CaO$ and $K_2O$. The composition of the bath 6 is chosen in relationship with the desired bath temperature, in order to obtain the bath viscosity compatible with the invention.

$B_2O_3$ melts at a low temperature (460° C.), but its viscosity in the liquid state is very high. So, the bath viscosity is diminished by the addition of mainly $Li_2O$, and possibly also of $Na_2O$ and/or the other previously cited oxides. $Li_2O$ is preferred because this oxide is very stable and will not be reduced by any alloying elements of the steel. Moreover, $Na_2O$ strongly increases the hygroscopic nature of the solidified oxides, which makes the material more difficult to handle.

For example, a mixture $Li_2O$—$B_2O_3$ 50/50% in weight melts at 650° C. (its composition is close to the eutectic of the mixture, which is at $Li_2O$—$B_2O_3$ 47-53% in weight and 33%-67% in moles, and has a viscosity of $0.3.10-3$ Pa·s or less at temperatures of 665° C. or more. If a lower temperature is required for advantageously implementing the process of the invention (for example because a lower temperature is less energy-consuming), Na2O, CaO or K2O can be added in the amounts cited above. That makes possible to have the required viscosity for the bath 6 at a temperature between 600 and 680° C. If the bath temperature is set at a relatively high value (up to 900° C., for example), it is often sufficient to have a Na2O content of 10% or lower, according to the balance between the B2O3 and Li2O contents.

The residence time of the sheet in the molten oxides bath 6 depends, of course, on the running speed of the sheet 1 and of the geometry of the vessel 5. It may be as low as 1 s, as shown by experimental studies, if the quantity of oxides to be removed from the surfaces of the sheet 1 is not too high, and if these oxides are not very adherent to the sheet 1. Higher residence times, between 1 and 10 s, may be useful for obtaining more surely a complete cleaning of the sheet 1, and can be obtained, for example, by a regulation of the dipping length inside the crucible.

No upper limit for the residence time necessary for cleaning the surfaces of the sheet 1 exists. Most generally, it will not be useful to have a residence time higher than 5 s, if the cleaning of the sheet surfaces is the only function of the molten oxides bath 6. If the function of the molten oxides bath (5) is also to perform a thermal treatment on the sheet (1), the residence time may be sensibly higher, for example 30 s or 1 min.

The bath 6 is placed under a non-oxidizing atmosphere for iron, composed for example of N2 and H2 gases (for example N2+1% H2). The bath 6 is preferably stirred by stirring means (not shown) such as bubbling means or any other known stirring devices.

After the cleaning module 4, the steel sheet 1 runs through a wiping module 7, in which the residual molten oxides remaining on the surfaces of the steel sheet 1 are eliminated. These residual molten oxides can be easily and quickly removed from the surfaces, thanks to the non reactivity of the strip with the molten oxides and thanks to the value of specific viscosity 11 of the bath 6, and this step does not slow down the production. Said wiping module 7 can include any suitable means, such as one or several gas nozzles 8, and/or brushes, or any other means allowing the removal of the remaining molten or solidified oxides droplets of the surfaces of the steel sheet 1. If the oxides are removed by gas blowing, the gas is preferably hot (550° C. at least) for avoiding a solidification of the oxides droplets which would make them difficult to remove by gas blowing. If the oxides droplets are already solidified, a brushing performed at a high temperature (450-550° C.) is optimal.

The steel sheet 1, then, runs through a coating module 9, such as a galvanization module where the steel sheet 1 is immersed into a bath 10 of molten zinc or zinc alloy, as is classically known.

From its entrance into the oven 3 to its entrance into the coating bath 10, the steel sheet 1 is placed under a non-oxidizing atmosphere by means of one 14 or several snouts in which a neutral (N2) or reductive (N2—H2) atmosphere is kept.

If the temperature TS of the steel sheet 1 as it enters the galvanization bath 10 is too high to guarantee a good adhesion of the zinc coating, the steel sheet 1 can optionally run through a cooling module 11 placed before the coating module 9. In the example shown on FIG. 1, this cooling module 11 is set just after the wiping module 7, but it could be placed closer to the coating module 9. Placing the cooling module 11 relatively remote from the coating module 9 allows to easily placing between them a set of brushes 12, which can eliminate the last traces of solidified oxides which might remain of the surfaces of the sheet 1. This cooling module can include, for example, nozzles projecting water on the steel sheet 1, or can be any cooling module commonly used in classical hot dipping lines. The cooling module 11, if present, must set the sheet 1 at a temperature which is compatible with a good performing of the coating operation. When the sheet 1 enters the coating bath 10, its temperature must not be too high, in order not to impair the adhesion of the Zn coating, and it must not be too low in order not to excessively cool the coating bath 10. Most generally, this temperature can be set at about 10-20° C. above the coating bath temperature.

After its exit from the coating bath 10, the sheet 1, as it is known in the art, is treated by a device 13 (such as a gas blowing device) which sets the thickness of the coating layer.

The galvanization step is, in the described example, performed on the same treatment line than the cleaning of the sheet 1. But it would be conceivable to perform it on a separate line, provided that a reoxidation of the surfaces of the sheet 1 is carefully avoided before the galvanization (or any other type of coating operation).

In the bath 6, the molten oxides get combined with the oxides which remain at the surfaces of the sheet 1, and remove them from the surfaces, according to the invention.

Figure 2:
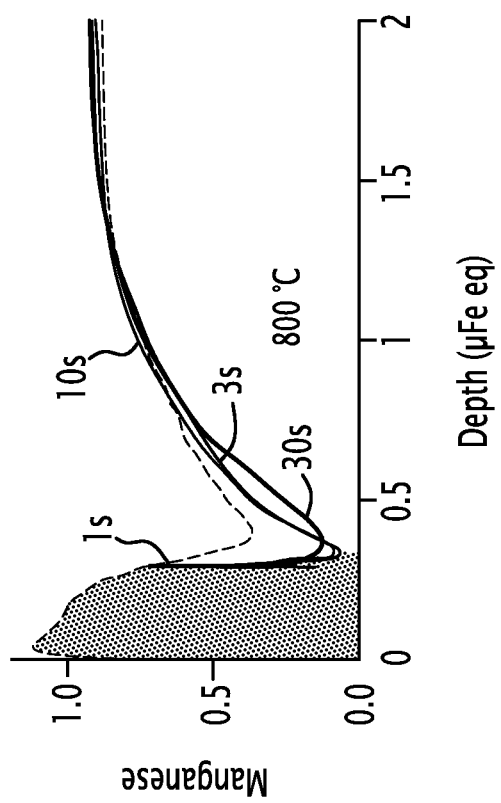
FIG. 2, which shows a Glow Discharge Optical Emission Spectrometry (GDOES) in depth profile, made before and after dipping a TWIP steel in an oxide bath at 800° C. during 1, 3, 10 or 30 seconds, FIG. 3, which shows a GDOES in depth profile made before and after dipping the same TWIP steel as the one of FIG. 2, in an oxide bath at 700° C. during 1, 3, 10 or 30 seconds.

FIG. 2 shows that the Mn oxide, which grow on the surface of a TWIP steel containing 20% Mn (gray area under the dot line), during the annealing in a radiant tube furnace containing N2+5% H2+0.04% H2O, is quite completely eliminated after a short dipping of 1 second in a reference oxide bath at 800° C. containing 50% B2O3 and 50% Li2O. Longer dipping times do not affect the surface chemistry.

The TWIP steel composition used for such trial includes 23% of Mn.

Figure 3:
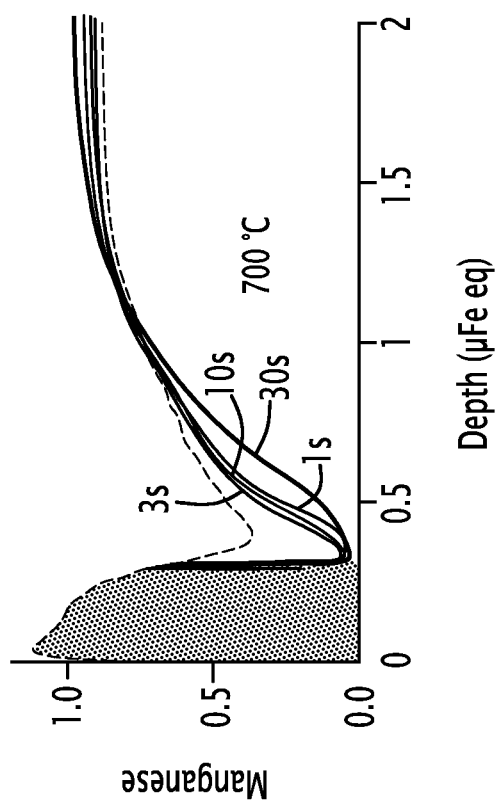

FIG. 3 shows that the same observation is made if the oxide bath temperature is kept at 700° C., all trial conditions being identical with the trial of FIG. 2.

In a second embodiment of the invention, the oven 3 may be suppressed, and the usually performed annealing operation takes place in the molten oxides bath itself, if:

the bath temperature is set at a value which allows to obtain the metallurgical transformations required by the annealing;

and the residence time of the sheet 1 in the bath 6 is sufficiently high for obtaining these metallurgical transformations; from a few seconds up to, for example 30 or 60 s; these durations are often sufficient to this end, depending on the sheet composition and thickness, and of the kinetics of the desired metallurgical transformation.

Also, a first thermal treatment may be performed in the oven 3, and a second treatment at a same or different temperature may be performed in the molten oxides bath 5.

The invention is particularly efficient on the following classes of steels, which contain easily oxidized elements in significant amounts:

interstitial-free steels, which may contain up to 0.1% by weight of Ti;

dual-phase steels such as DP 500 up to DP 1500 steels which may contain about up to 3% by weight of Mn in association with up to 1% by weight of Si, Cr and/or Al;

TRIP steels, like TRIP 780 steel which contains for example about 1.6% by weight of Mn and 1.5% by weight of Si;

TRIP or dual-phase steels containing P;

TWIP steels which have a very high content in Mn (typically 17-25% by weight), low density steels such as Fe—Al steels which may contain for example up to 10% by weight of Al;

stainless steels, which have a very high chromium content (typically 13-25% by weight), associated with other alloying elements (Si, Mn, Al.)

What is claimed is:

1. A method of treatment of a running ferrous alloy sheet containing at least one easily oxidized element, comprising the steps of:
    immersing the ferrous alloy sheet in a molten oxides bath, the molten oxides bath having a viscosity between $0.3.10^{-3}$ Pa·s and $3.10^{-1}$ Pa·s, a surface of the molten oxides bath being in contact with a non-oxidizing atmosphere, the molten oxides being inert towards iron;
    running the sheet in the molten oxides bath for a residence time of at least 1 s; and
    eliminating residues of molten oxides remaining on surfaces of the ferrous alloy sheet at an exit of the bath.

2. The method of treatment according to claim 1, wherein the running sheet is, then, immersed into a coating bath of molten metal or metal alloy.

3. The method of treatment according to claim 1, wherein the residence time of the running sheet in the molten oxides bath is between 1 and 10 s.

4. The method of treatment according to claim 1, wherein before an entry of the sheet into the molten oxides bath, the sheet undergoes a thermal treatment.

5. The method of treatment according to claim 1, wherein a composition of the molten oxides bath comprises:
    45% w≤$B_2O_3$≤90% w; and
    10% w≤$Li_2O$≤45% w.

6. The method of treatment according to claim 5, wherein the composition of the molten oxides bath further includes between 0.1% and 20% of at least one of: $Na_2O$, $CaO$, $K_2O$.

7. The method of treatment according to claim 1, wherein the at least one easily oxidized element is at least one element chosen among: Si, Mn, Al, Cr, B, P.

8. The method of treatment according to claim 2, wherein said coating bath is a bath of molten Zn or Zn alloy.

9. A treatment line of a running ferrous alloy sheet for implementing the method of treatment according to claim 1, comprising:
    a molten oxides bath having a viscosity between $0.3.10^{-3}$ and $3.10^{-1}$ Pa·s, a surface of the bath being in contact with a non-oxidizing atmosphere, the molten oxides being inert towards iron and
    an elimination device for eliminating residues of molten oxides remaining on surfaces of the ferrous alloy sheet at an exit of the molten oxides bath.

10. The treatment line according to claim 9, further comprising a heating device for heating the ferrous alloy sheet located upstream of the molten oxides bath.

11. The treatment line according to claim 9, further comprising a coater for coating the ferrous alloy sheet with a molten metal or metal alloy located downstream of the molten oxides bath.

12. The treatment line according to claim 11, wherein the molten metal or metal alloy is Zn or Zn alloy.

13. The treatment line according to claim 9, wherein the elimination device includes nozzles which project a gas onto the sheet surface.

14. The treatment line according to claim 9, wherein the elimination device includes a cooling device for the sheet.

15. The treatment line according to claim 9, wherein the elimination device includes mechanical devices.

16. The treatment line according to claim 10, wherein the heating device is an oven.

17. The treatment line according to claim 11, wherein the coater is a coating bath.

* * * * *